METHOD OF FORMING INTERMETALLIC SUPERCONDUCTORS

Filed Sept. 24, 1962 2 Sheets-Sheet 1

United States Patent Office
3,296,684
Patented Jan. 10, 1967

3,296,684
METHOD OF FORMING INTERMETALLIC SUPERCONDUCTORS

Lloyd R. Allen, Belmont, and Robert A. Stauffer, Weston, Mass., assignors, by mesne assignments, to National Research Corporation, Cambridge, Mass., a corporation of Massachusetts Filed Sept. 24, 1962, Ser. No. 225,784
3 Claims. (Cl. 29—155.5)

This application is in part a continuation of S.N. 102,593 filed April 12, 1961, and now abandoned, and in part a continuation of S.N. 133,653, filed August 24, 1961, and now abandoned.

The present invention relates to superconducting members—wire, sheet, rods, foil and other articles including a superconductive material, and particularly to such members as adapted for use in magnetic insulation, solenoid coils, armatures and the like.

In recent years, manifold uses of such members have developed, particularly in magnets of high field strength. The use of these members as solenoids and insulators breaks the bottlenecks of power requirements, plant costs and overheating which limit the application of conventional materials in high field strength magnets. Superconducting materials have no resistance. Hence the power requirements of solenoids made with members including such materials are limited to accessories such as cryogenic refrigerators and dealing with magnetic transients. This lack of resistance obviates the problems associated with resistance heating. Superconducting materials are diamagnetic. They shield and contain magnetic fields.

The realm of superconductivity is cryogenic temperatures. Superconductive materials do not exhibit this property until their temperature is lowered to this range. It is implicit in all discussion of superconductive materials throughout this specification that the temperature of the material is maintained in the appropriate cold range.

A fundamental limitation of superconductive materials is that a sufficiently high external magnetic field breaks down superconductivity. The magnetic field generated by the material itself contributes to this limiting field. Thus the figure of merit of superconductive materials is critical current—the highest current which a superconductive material can carry at a given external magnetic field and temperature without resistance. Nonetheless, superconductive materials offer the promise of superconducting members producing hundreds of thousands gauss and carrying millions of amperes while resisting high external fields on the order of 100 kilogauss and higher. Realization of these potentialities would provide an important advance in the control of plasmas, laboratory research in masers and particle accelerators, magnetic bearings and solid state physics.

One of the most promising of the superconductive materials is the compound $Nb_3Sn$. This compound is discussed below as the illustrative material utilized in preferred modes of the invention.

A first important aspect of realizing the potential of $Nb_3Sn$ is the arrangement of the compound uniformly to achieve high current densities. In the prior art mixtures of tin and niobium are sintered to produce a niobium tin system with a low percentage of the compound $Nb_3Sn$. In the present invention, thin layers uniformly comprising the compound are prepared. The compound layers are held on a substrate which is made as small as possible to provide maximum current density for the composite member. This is applicable to both annular substrates such as wires and flat substrates such as foil.

A second important aspect of realizing the potential of the $Nb_3Sn$ system is that $Nb_3Sn$ is extremely brittle. Prior art techniques for using $Nb_3Sn$ require the fabrication of a ductile sheath containing a mixture of tin and niobium into the desired (and final) shape, e.g.—drawn to fine wire and wound as a solenoid. The mixture is subsequently heated to around 970° C. to react the tin and niobium to form $Nb_3Sn$. This process is inconvenient. It does not permit the manufacture of superconductive members per se; one must take the finished product utilizing the superconductive member. The present invention allows the member to be worked after the $Nb_3Sn$ is formed.

It is therefore an object of this invention to provide a superconducting member incorporating a hard superconductor in the form of thin films to achieve high current densities under high magnetic fields.

It is a further object of this invention to provide a superconducting member which can be fabricated.

It is a still further object of this invention to provide a process of making such members that will be economically feasible.

It is a more specific object of this invention to provide a superconducting member incorporating the hard superconductor, $Nb_3Sn$, in the form of thin films of the compound.

It is another specific object of this invention to provide a superconducting member with thin films of $Nb_3Sn$ mounted on a ductile base, so that the resulting member will be capable of undergoing subsequent fabrication.

It is another specific object of this invention that the process of producing thin films of $Nb_3Sn$ on a ductile substrate will be economically feasible.

For simplicity, the invention is described in terms of a single thin film of $Nb_3Sn$ on a ductile base. It will be appreciated that the films and bases can be multiplied for commercial applications. This multiplies the current carrying capacity of the superconductive member. Where the layers are multiplied, the niobium acts as an insulator to prevent short circuiting between the superconducting films. While niobium itself is a superconductor, its superconductivity is lost in the range of magnetic fields and current densities of interest in the instant invention. The electrical resistance of the niobium is then infinite relative to that of the $Nb_3Sn$. Additionally, layers of conventional copper and non-metallic insulation may be provided to prevent short circuiting at higher currents, temperatures, or magnetic fields where superconductivity is gone.

The invention accordingly comprises the process involving the several steps and relation and order of one or more of such steps to the others which are exemplified in the following detailed disclosure and the scope of the application of which will be indicated in the claims.

For a fuller understanding of the nature and objects of the invention, reference should be had to the following detailed description taken in connection with the accompanying drawings wherein.

Figures 1, 3:
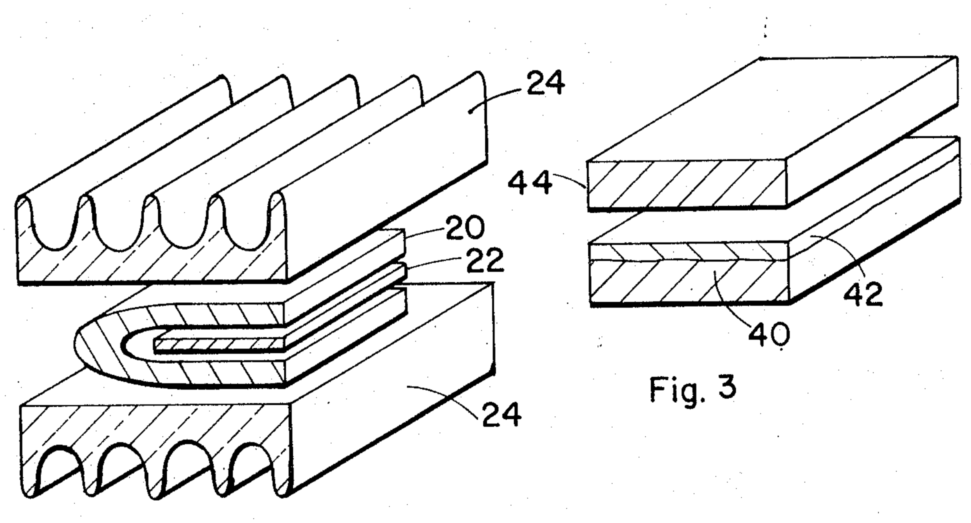
FIG. 1 is a diagrammatic, schematic, partially sectional view of an embodiment of the invention showing an exploded arrangement of niobium and tin foil and ceramic blocks for confining them.
FIGS. 3 and 4 are diagrammatic, schematic, partially sectional views of other embodiments similar to that of FIG. 1 wherein tin clad niobium foil is used.

The present process invention is carried into effect in accord with the basic teachings of our copending application, S.N. 102,593 filed April 12, 1961, by bringing the base metal (niobium) into contact with a thin layer of the other metal (tin) and heating to form an interdiffusion layer of an intermetallic compound ($Nb_3Sn$) comprising the two metals. The process is adjusted so that the thickness of the resultant $Nb_3Sn$ layers falls within the limits discussed below. There are two critical phases of this process. The first is the maintenance of an adherent layer of tin which will stay on the niobium long enough for the reaction to take place. The second is the control of heating temperature and time for a given combination of niobium and tin to produce the desired layer of $Nb_3Sn$. In connection with the maintenance of an adherent layer of tin, the basic criterion is the wettability of the niobium surface. If the niobium surface is completely wettable, the applied tin layer will, upon subsequent heating, flow over the niobium surface smoothly and react easily and predictably with the niobium base to form the interdiffusion surface layer of $Nb_3Sn$. If the niobium surface is not completely wettable, due to the presence of contaminants, the tin tends to ball up upon heating and leave exposed patches of niobium surface. The subsequent reaction leaves a network of $Nb_3Sn$ patches on the niobium surface. These problems are overcome in the invention of Allen, Rupp and Stauffer disclosed in copending S.N. 188,177, filed April 17, 1962, and in the invention of Allen, Das, and Stauffer disclosed in copending S.N. 207,320 filed July 3, 1962, and in the invention of Allen disclosed in copending S.N. 208,937, filed July 10, 1962. The preferred embodiments of the present process invention attack the problem of wettability in another manner. In the preferred embodiments of the present process invention, the molten tin is physically held in contact with the niobium during the heat treatment. Mechanical barriers prevent the tin from escaping during the heat treatment. Unlike the inventions of the above three copending applications which involve the improvement of the wettability of the niobium surface, the embodiment of Example 1 below succeeds despite the incomplete wettability of the niobium surface. In the embodiments described in connection with Examples 2 and 3, the holding technique of Example 1 is combined with the wettability improvement of the copending application of Allen, Das and Stauffer, cited above. The physical confining techniques of these embodiments comprise (1) forcing the niobium and tin together between ceramic blocks during heat treatment or (2) tightly winding spools comprising niobium and tin in contact. These two examples are merely illustrative examples of techniques for carrying out the generic process of physically confining niobium and tin layers in contact.

The present product invention comprises a thin layer of an intermetallic compound of a selected base metal and another metal on a substrate of the base metal, specifically a thin layer of $Nb_3Sn$ on a niobium base. The range of thicknesses for coatings of $Nb_3Sn$ on wire or foil or other ductile base can be between 100 Angstroms and .0003 inch. For commercial purposes, the lower limit of the coating on wire or foil would have to be at a higher value for carrying adequate currents to be useful in high field strength solenoids and the like. It has been found that a superconductive coating at least large enough to be identified by X-ray diffraction suits this purpose and this is the preferred lower limit of the instant invention. In the case of coatings of $Nb_3Sn$, this is on the order of 2000 Angstroms, and higher. The upper limit is necessary since an overly thick coating of the brittle intermetallic superconducting compound will crack upon bending. This upper limit is about .0003 inch for coatings of $Nb_3Sn$ on wire. However, the upper limit can vary depending on the diameter of the wire and the bending requirements of the member. Generally, the upper limit of thickness for coatings on foil is greater than that for coatings on wire since typical bending requirements such as winding to form a solenoid would produce lateral stresses in a coating on wire, but not in a coating on foil.

As for the thickness of the niobium base, it can be varied within a wide range. It can be as small as practicable or very large. The only essential feature is that it be sufficiently ductile for the required fabrication into superconducting members. In preferred embodiments, the base takes the form of wire or foil which is suitable for winding into solenoids. The term wire is used in its usual meaning: metal of regular cross section, generally round; usually made in sizes to conform to various standard wire gauges, the range of sizes being too small to be produced by rolling and therefore produced by special wire techniques such as drawing. The term foil is a term of art in the metalworking industry, meaning metal sheet of indefinite width having a thickness about .005 inch or less. It will be appreciated that the niobium base can be replaced by a niobium coated material, the niobium being applied by known vacuum deposition techniques using electron beam heating to evaporate the niobium. There must be sufficient niobium deposited to react with the tin leaving enough excess niobium to provide flexibility. The references in this application to a niobium base or niobium element or niobium substrate are intended to incorporate various substrates comprising niobium, as for instance the niobium coated material of the above suggestion.

Referring now to FIG. 1, there is shown an exploded arrangement of an embodiment of the invention wherein niobium foil 20 is folded about tin foil 22. The composite sandwich thus formed is held between ceramic blocks 24 during heating. The tin is thereby confined between layers of niobium. The following nonlimiting example shows the efficacy of this technique.

*Example 1*

Niobium foil .0005″ thick was folded longitudinally around .0005″ tin foil to form a Nb:Sn:Nb sandwich about .0015″ thick. The sandwich was placed between ceramic blocks as shown in exploded fashion in FIG. 1 of the drawings. The blocks and foil sandwich were heated at 970° C. (measured by thermocouple) for 60 minutes in a vacuum furnace and removed after cooling the furnace to room temperature.

Several test samples .059″ wide were cut from the sandwich and subjected to increasing currents at liquid helium temperature and magnetic fields up to 13 kilogauss. The results of these tests are indicated in the following table for samples A, B, C, D and E.

| External Field (Kilogauss) | Critical Current (Amperes) | | | | |
|---|---|---|---|---|---|
| | A | B | C | D | E |
| 13 | 27 | 28 | 36 | 26 | 11 |
| 12 | 28 | 29 | 37 | 27 | 12 |
| 11 | 31 | 29 | 43 | 29 | ------ |
| 9.75 | 37 | 30 | 50 | 35 | 15 |
| 7.5 | 48 | ------ | 68 | 48 | 23 |
| 5 | 80 | ------ | >82 | >80 | 72 |

Since these sandwiches are .0015″ thick and .059″ wide their cross-section area is $88.5 \times 10^{-6}$ sq. in. or $.57 \times 10^{-3}$ sq. cm. Tabulating the samples of Example 1 in terms of current density:

| External Field (Kilogauss) | Current Density (Amps per sq. cm.×1,000) | | | | |
|---|---|---|---|---|---|
| | A | B | C | D | E |
| 13 | 47.4 | 49.2 | 63.3 | 45.6 | 19.3 |
| 12 | 49.2 | 51 | 65 | 47.4 | 21.1 |
| 11 | 54.4 | 51 | 75.5 | 51 | ---- |
| 9.75 | 65 | 52.6 | 87.8 | 61.5 | 26.3 |
| 7.5 | 84.3 | ---- | 119 | 84.3 | 40.1 |
| 5 | 140 | ---- | ---- | ---- | 126 |

Figure 6:
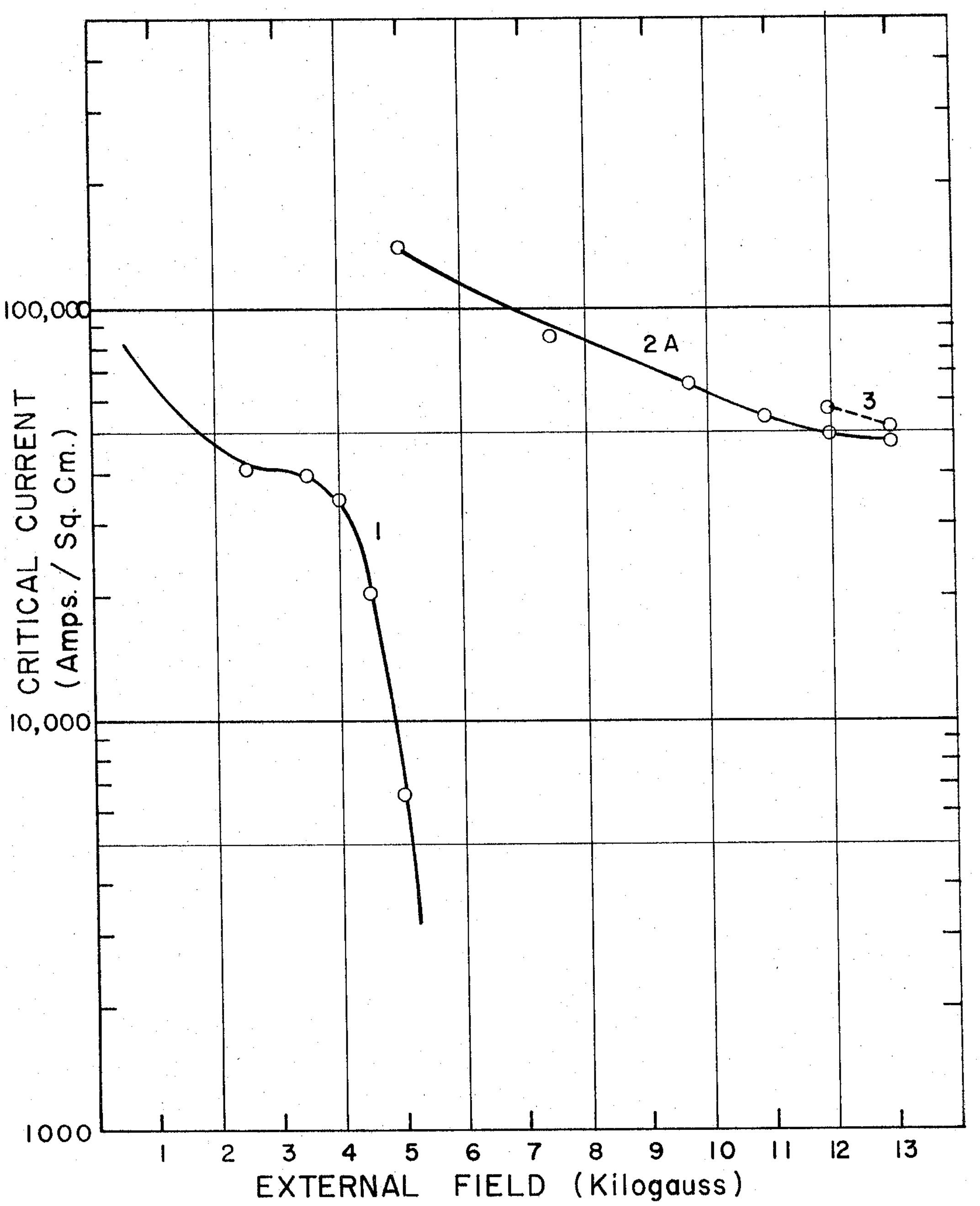
FIG. 6 is a semi-log plot of critical current density as a function of external magnetic field for various samples and control runs, as explained below.

The current densities observed for sample A are plotted in FIG. 6 as curve 2A. Foil made in accord with the techniques of Example 1 is bendable. Foil of this type will tolerate external fields in excess of 100 kilogauss, although critical current will be less than the values obtained at low external fields. The foil can be laminated to multiply its current carrying capabilities.

The particular techniques used in Example 1 succeeded despite the fact that no special techniques were used to improve the wettability of the niobium surface in contact with tin. Generally, it is necessary to precondition the niobium-tin interface to obtain an adherent layer of tin which will wet the niobium surface and react with the niobium base to form the $Nb_3Sn$ layer upon subsequent heating. In this case, the molten tin produced by heating was trapped between niobium layers and expanded at a faster rate than the solid niobium. Thus, the tin was physically held in contact with the niobium long enough for the reaction to form $Nb_3Sn$ to take place.

Figures 2, 4:
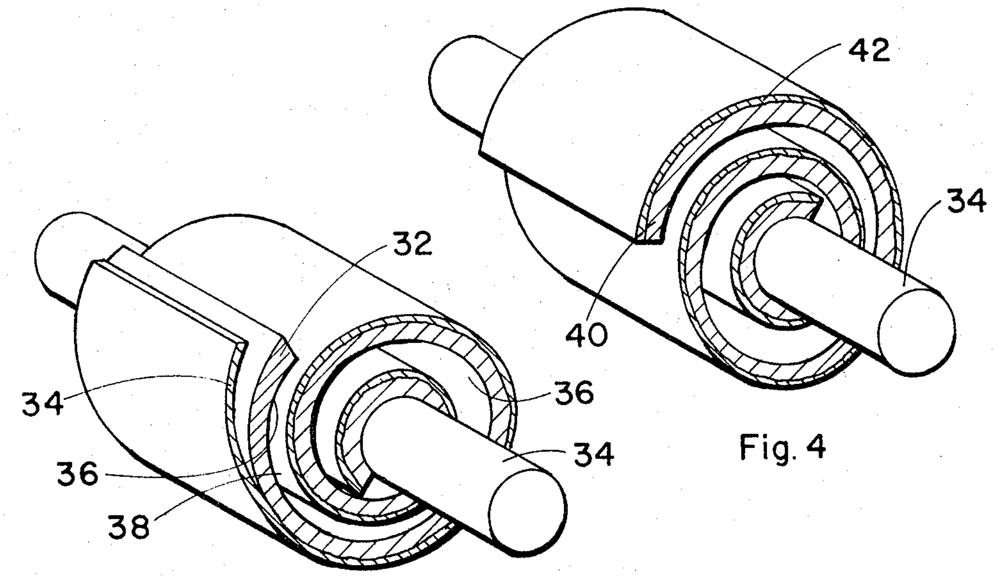
FIG. 2 is a diagrammatic, schematic, partially sectional view of another embodiment of the invention showing another arrangement for confining tin between layers of niobium foil.

Referring now to FIG. 2, there is shown a variation of this technique more suitable to commercial usage. Adjacent layers of niobium foil 30 and tin foil 32 are wound around a spool 34 so that a long length of tin will be confined between niobium surfaces throughout. Further, the use of a tightly wound spool permits a long length of foil to be placed in a small furnace chamber. The wound spool is heat treated and it has been found that after heat treatment the foil can generally be unwound. If difficulty is encountered in unwinding the foil, several techniques can be used to expedite unwinding. For instance, the underside 36 of the niobium foil can be coated with a wash such as magnesium oxide to prevent it from sticking to the surface 38 of the adjacent layer of tin.

Referring now to FIG. 3 there is shown a sheet of niobium foil 40 clad with a layer of tin 42 by vigorous cold working. This composite alone can be heat treated effectively, as demonstrated in the copending application of Allen, Das, and Stauffer, S.N. 207,320, filed July 3, 1962. In accordance with the present invention, an additional layer of niobium 44 is placed over the tin layer and the sandwich is confined between ceramic blocks, as in FIG. 1. The following nonlimiting example demonstrates the efficacy of this technique.

*Example 2*

A piece of niobium foil was clad with tin on one side by vigorous cold rolling of niobium and tin layers held in contact to produce a composite thickness of .0035". The thickness of the tin layer on the clad foil was about .0005". Another layer of niobium foil .002" thick was placed over the tin to thereby sandwich the tin between two relatively thick layers of niobium.

The sandwich was heat treated as in Example 1 and .059" wide samples (i.e. $1.33\times10^{-3}$ sq. cm. composite cross section) cut therefrom were then tested for critical current as in Example 1. The critical current was 68 amperes at 13 kilogauss and 76 amperes at 12 kilogauss. These represent densities of 51,000 and 57,000 amperes per sq. cm., respectively.

In order to obtain a basis of comparison, a piece of niobium foil clad with tin on both sides, having a thickness of .0022" was electrically tested without heating. The critical current vs. external field at liquid helium temperature is indicated as curve #1 in FIG. 6. The test sample used was 59 mils wide. The thickness of each layer of tin was about .0002" giving a niobium thickness of about .0019".

The current densities obtained with the unheated foil are shown in curve 1 of FIG. 6. It is obvious that no current is carried in the tin coating since the transition temperature of tin is 3.75 at zero field and less at higher fields. The current was carried superconductively in the niobium base.

In another embodiment shown in FIG. 4 adjacent tin and niobium layers are provided in the form of the single sheet of niobium 40 clad on one side with tin 42 as in FIG. 3 and wound on a spool 34 for placing into a furnace. The techniques for expediting unwinding discussed above may be used. Another way of preparing the wound spool is to select the amount of tin as is stoichiometrically correct and continue heat treating long enough to react all the tin. A niobium foil with a coating of $Nb_3Sn$ and no excess tin will present little difficulty in unwinding. Another approach is to adjust the heat treatment for preliminary heating of unwound clad foil at temperatures well below the $Nb_3Sn$ reaction temperature to dissolve niobium in tin, then winding and heat treating to produce $Nb_3Sn$.

Figures 5A, 5B, 5C:
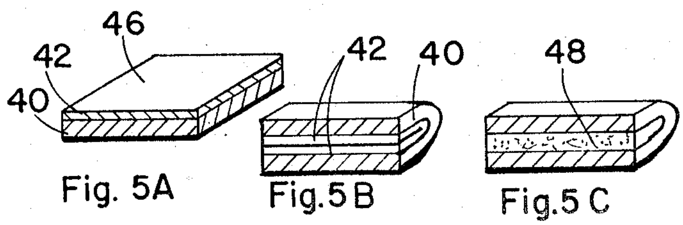
FIGS. 5A, 5B and 5C show another embodiment of the invention wherein clad foil is used.

Another embodiment of the invention is shown in FIGS. 5A, 5B and 5C. In FIG. 5A the clad foil 40 of FIG. 2 is folded about its longitudinal center line 46 to produce the sandwich of FIG. 5B wherein all the tin is in the center and the niobium is on the outside. The sandwich of FIG. 5B is heat treated to react the tin with its adjacent niobium surfaces to produce the superconductive foil of FIG. 5C comprising outer layers of niobium sandwiching a central thin layer 48 of $Nb_3Sn$.

*Example 3*

Niobium foil was clad with tin on one side. The thickness of the clad foil was in a 10:1 ratio of Nb:Sn. The foil was folded longitudinally to sandwich the tin in the center, enclosed in ceramic blocks as in FIG. 1, and heated in vacuum at 970° C. for 30 minutes. Samples 59 mils. wide were cut from the heated foil and tested electrically. The following results were obtained.

| Field (Kilogauss) | Critical Current (Amperes) Sample | | |
|---|---|---|---|
| | A | B | C |
| 13 | 16 | 12 | 13 |
| 12 | 17 | 13 | 14 |
| 11 | 19 | 14 | 15 |
| 9.75 | 22 | 21 | 19 |
| 7.5 | 28 | 37 | 34 |
| 5 | 59 | 62 | 64 |

The foil of FIG. 5B may be wound into a spool for heat treating long lengths in a furnace. Little difficulty will be encountered in unwinding the sandwiches since the adjacent turns of the coils will have niobium surfaces abutting and the heat treatment temperatures are well below the melting point of niobium. However, some precautions should be taken to prevent tin from escaping from its enclosing niobium layers during heat treatment.

FIG. 6 is a semi-log plot graphically depicting some of the results discussed above. The abcissa is external field in kilogauss and the ordinate is critical current in amperes per square centimeter. Curve 1 is for unheated tin coated niobium foil discussed in Example 2. Curve 2 is for the heat treated foil of sample A of Example 1, made in accord with one embodiment of the present invention. Curve 3 is for the heat treated foil of Example 2, made in accord with another embodiment of the present invention. The thickness figures given for the above foils in Examples 1 and 2 are average thicknesses across the length of the foil. Therefore the cross section area figures and current density figures are averages. The only purpose of this graph is to illustrate in a qualitative sense the potentialities of foil made in accord with the present invention, the specific embodiments of FIGS. 1–5C being intended as illustrative examples of the application of this invention to foil. The invention is equally applicable to annular members such as rod, wire, and the like.

Since certain changes may be made in the above product and process without departing from the scope of the invention herein involved, it is intended that all matter contained in the above description, or shown in the accompanying drawing, shall be interpreted as illustrative and not in a limiting sense.

What is claimed is:

1. The process of forming a superconductive $Nb_3Sn$ layer on a ductile base comprising at least an outer layer of niobium comprising the steps of: placing a layer of tin in contact with the niobium surface, heating the tin and niobium to produce an interdiffusion layer of $Nb_3Sn$ at the niobium tin interface, simultaneously physically confining said tin so that it remains in contact with the niobium surface, the heating being continued for a sufficiently long time and at a sufficiently elevated temperature to produce an intermetallic layer that can be identified by X-ray diffraction, the heat treatment being stopped before interdiffusion proceeds to the point where the composite structure loses ductility, wherein said physically confining step is accomplished by tightly winding the contacting niobium and tin into a spool and the heating step comprises placing the spool into a metallurgical furnace, and wherein the turns of the spool are separated by a refractory wash to prevent sticking of adjacent turns via the formation of $Nb_3Sn$ bridges.

2. The process of claim 1 wherein the wash is magnesium oxide.

3. An improved process of forming an elongated bendable foil comprising the compound $Nb_3Sn$ as a diffusion layer, therein, comprising the steps of forming a niobium foil coated with tin, the coating thickness being about .0005 inch, applying a separating agent wash to the foil and winding the foil into a tight spool, heating the spool in a contaminant free medium at about 970° C. for a time of at least a half hour, and unwinding the spool after said heat treatment.

References Cited by the Examiner

UNITED STATES PATENTS

| | | | |
|---|---|---|---|
| 2,050,298 | 8/1926 | Everett. | |
| 2,077,682 | 4/1937 | Everett. | |
| 2,691,815 | 10/1954 | Boessenkoll et al. | 29—497.5 |
| 2,837,818 | 6/1958 | Storcheim | 29—494 |
| 2,853,768 | 9/1958 | Boucek | 29—194 |
| 2,854,737 | 10/1958 | Gray | 29—194 |
| 2,982,017 | 5/1961 | Drummond | 29—470 |
| 2,993,269 | 7/1961 | Kelley | 29—424 |
| 3,005,258 | 10/1961 | Sangdahl | 29—494 |
| 3,090,116 | 5/1963 | Burgess | 29—470.1 |
| 3,181,936 | 5/1965 | Denny et al. | 29—155.5 |

JOHN F. CAMPBELL, *Primary Examiner.*

HYLAND BIZOT, WHITMORE A. WILTZ, *Examiners.*

P. M. COHEN, *Assistant Examiner.*